US006999872B2

(12) United States Patent
Fabian et al.

(10) Patent No.: US 6,999,872 B2
(45) Date of Patent: Feb. 14, 2006

(54) METHOD FOR AUTOMATICALLY DELETING A TRAFFIC ANNOUNCEMENT

(75) Inventors: Thomas Fabian, Hildesheim (DE); Peter Kreft, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 10/450,923

(22) PCT Filed: Nov. 27, 2001

(86) PCT No.: PCT/DE01/04466

§ 371 (c)(1),
(2), (4) Date: Nov. 12, 2003

(87) PCT Pub. No.: WO02/47050

PCT Pub. Date: Jun. 13, 2002

(65) Prior Publication Data

US 2004/0073362 A1    Apr. 15, 2004

(30) Foreign Application Priority Data

Dec. 8, 2000    (DE) ................................ 100 61 044

(51) Int. Cl.
*G08G 1/0967* (2006.01)
*G01C 21/34* (2006.01)

(52) U.S. Cl. ...................... 701/210; 701/209; 701/211; 340/995.13; 455/414.3; 455/456.3

(58) Field of Classification Search ................ 701/210, 701/211, 208, 209; 340/905, 902, 995.13; 455/414.2, 414.3, 456.1, 456.2, 456.3
See application file for complete search history.

(56) References Cited

U.S. PATENT DOCUMENTS

| 5,933,094 | A  |   | 8/1999  | Goss et al. ................. 340/905 |
|-----------|----|---|---------|--------------------------------------|
| 6,169,515 | B1 | * | 1/2001  | Mannings et al. ........ 342/357.1    |
| 6,240,364 | B1 | * | 5/2001  | Kerner et al. ............... 701/210 |
| 6,298,301 | B1 | * | 10/2001 | Kim .......................... 701/200 |
| 6,334,086 | B1 | * | 12/2001 | Park et al. .................. 701/117 |
| 6,347,278 | B1 | * | 2/2002  | Ito ............................ 701/200 |
| 6,870,851 | B1 | * | 3/2005  | Leinwand et al. .......... 370/400    |

FOREIGN PATENT DOCUMENTS

| EP | 0 979 987   | 2/2000 |
|----|-------------|--------|
| WO | WO 93 18495 | 9/1993 |
| WO | WO 00 02010 | 1/2000 |

* cited by examiner

*Primary Examiner*—Tan Q. Nguyen
(74) *Attorney, Agent, or Firm*—Kenyon & Kenyon

(57) ABSTRACT

To provide a method of automatically deleting a traffic message that is associated with at least one directed segment and/or at least one node, in which traffic messages are automatically deleted at the earliest possible time while ensuring that the route segment affected by the traffic message is not traveled again, the traffic message is deleted when the sum of the resistances remaining between the current position and the destination is less than or equal to a reference resistance which is determined by the sum of the resistances remaining between a reference segment and the destination, the reference segment being the segment subsequent to the segment of the route, in the direction toward the destination, that is affected by the traffic message and that was the route specified before the traffic message was taken into account.

14 Claims, 2 Drawing Sheets

Blockage automatically deleted

METHOD FOR AUTOMATICALLY DELETING A TRAFFIC ANNOUNCEMENT

FIELD OF THE INVENTION

The present invention relates to a method of automatically deleting a traffic message that is associated with at least one directed segment and/or at least one node, a route network, in particular a road network, being mapped in a memory unit as directed segments and nodes situated between the directed segments; a specific resistance being associated with each segment and/or each node in such a way that the resistance of a segment affected by the traffic message and/or the resistance of a node affected by the traffic message is increased, or that a segment affected by the traffic message and/or a node affected by the traffic message is blocked (infinite resistance); and the route being specified as a series of segments such that the sum of all resistances is minimum.

BACKGROUND INFORMATION

In general, for mathematical processing, a route network, in particular a road network, may be represented by a route search algorithm as a graph having segments and nodes. The segments represent the roads, and the nodes represent mesh points in the road network.

(Travel) resistances may be associated with the segments and/or nodes, the resistances being represented in the form of a travel segment or a travel time. When resistances, namely the segment resistances or path resistances, are associated with the segments in this context, the segment resistance or path resistance represents a measured variable for the expenditure to travel from one node to another in the road network. When resistances, namely the node resistances, are additionally or alternatively associated with the nodes, a resistance, or more precisely, the node resistance, is described in the node for every conceivable combination of an arriving segment and a departing segment.

In the simplest case, the segment lengths may be used as the path resistance. Alternatively, the travel time may be based on a segment as the path resistance, or the path resistance may be determined by a function in which the travel time, the path resistance, and/or other variables are entered on a weighted basis.

All conventional "best path" algorithms ultimately specify a route between a starting segment and a destination segment in directed graphs having the characteristic that the sum of all the resistances associated with the segments and/or the nodes has a minimum.

The route is described by a series of segments, and the remaining travel time, remaining route distance, and resistance remaining at the destination point being specified (in other words, if the segment length is selected as the path resistance, a search is made for the shortest route in the graph).

Based on this method, known from European Published Patent Application No. 979 987, for example, for determining a route from a starting point to a destination point on a route network, in particular a road network, navigation systems are currently able to dynamize the guidance of a means of transportation, in particular a motor vehicle, so that traffic messages triggered by a traffic-related event on the route to the destination, such as blockage, congestion, or stop-and-go traffic, and/or a traffic accident, for example, are detected and the navigation system automatically calculates a detour alternative to the original route, i.e., the route defined before the traffic message was taken into account.

In this context, traffic messages are represented in graphs by an increase in the path resistance of the affected segments; alternatively or additionally, it is also possible to represent the increase in resistance in the nodes. In addition to the increase in path resistances and/or node resistances, in principle an "avoidance" or "prohibition" of certain segments affected by a traffic message and/or certain nodes affected by a traffic message may be implemented; such a "prohibition" is algorithmically converted in such a way that this prohibition is equivalent to an absence of the corresponding segment and/or corresponding node, which is equated with the association of an infinite path resistance with the affected segment, and/or an infinite node resistance with the affected node.

Possible providers or suppliers of such traffic messages include external sources, for example radio transmitters which transmit coded traffic messages via their TMC (Traffic Message Channel, which is a channel for traffic broadcasts, i.e., a traffic radio channel which automatically detects traffic situations and provides appropriate traffic messages) in the RDS (Radio Data System)/TMC standard, or service providers which transmit traffic messages using the SMS (Short Message Service) of the GSM (Global System for Mobile Communication) network.

In such traffic messages from external sources, deletion is performed either by the radio transmitter providing separate deletion messages, or by the transmitter providing the traffic message with a period of validity immediately upon transmission to the navigation system, or the navigation system providing the traffic message with a separate period of validity; in each case the route must always be recalculated when traffic messages are deleted from external sources so that the navigation system is able to check whether the route could change again due to the absence of a blockage.

On the other hand, the driver him/herself (in the following: the driver) in comes into consideration as an internal source by manually defining a traffic-related event such as blockage, congestion, or stop-and-go traffic and/or a traffic accident on one or more segments of the route via an MMI (man-machine interface), and then allowing the navigation system to determine a detour alternative, i.e., a new route which bypasses the manual blockage. If the driver has reached the destination, the manual blockage may be automatically deleted from the navigation system.

The driver also may actuate the deletion of the manual blockage at any time via a suitable command in the MMI. After this driver-initiated deletion of blockages, however, the navigation system must always recalculate the route so that the navigation system is able to check whether the route could change again due to the absence of a blockage.

The existence of a particular problem in the criterion for automatic deletion of traffic messages may be illustrated by the fact that when the traffic message is deleted too soon the route disadvantageously reverts to the traffic segment to be avoided, and the driver is thus led once again through the triggering event for the traffic message, i.e., the blockage, congestion, or stop-and-go traffic and/or the traffic accident. (For example, the driver defines a segment when a route is present and blocks this segment manually; the navigation system determines a new alternative route which bypasses the manual blockage by the driver and which the driver follows; if the blockage is now deleted too soon from the navigation system, the new route inadvertently leads once more through the blocked segment of the route which was originally selected.)

In contrast, if the navigation system deletes the traffic messages too late (in the extreme case, as described above according to the related art, not until the destination is reached), valuable memory resources in the navigation system remain occupied too long by traffic messages which are of no value and irrelevant to the continuing route. (For example, assume a route from Hamburg to Munich for which the driver, in order to bypass a local construction site in the Hamburg city center, defines a blockage on this segment of the route, but this blockage is not deleted by the navigation system until several hours later when the destination in Munich is reached; if the driver is provided with, for example, a list of the deletions of individual blockages, or merely with a list of current blockages, a blockage in Hamburg is rather confusing if the driver is already in Munich.)

If it is left up to the driver to delete superfluous traffic messages because they are no longer relevant to the route, this is not conducive to road safety since the driver must concentrate on the navigation system. In addition, the navigation system must always recalculate the route, so that the driver is without guidance instructions during the recalculation.

DETAILED DESCRIPTION

Based on the above-mentioned disadvantages and shortcomings, the object of the present invention is to refine a method of the above-mentioned type so that traffic messages are automatically deleted by a navigation system at the earliest possible time; however, it should be ensured by the present invention that the driver is not guided again through the route segment affected by the traffic message.

Consequently, the essence of the present invention lies in the criterion which the navigation system evaluates for the automatic deletion of traffic messages. In the present invention, a traffic message is deleted by the navigation system precisely at the time when the resistance remaining on the route, from the instantaneous position of the means of transportation to the destination, first becomes less than or equal to the resistance remaining to the destination which the segment, subsequent to the traffic message in the direction toward the destination, had on the route at the time before the traffic message was taken into account with respect to the resistance.

According to one essential criterion of the present invention, the present method functions regardless of whether segment resistances (for which a specific resistance, or more precisely, the segment resistance, is associated with each segment), or node resistances (for which a specific resistance, or more precisely, the node resistance, is associated with each node), or both segment resistances and node resistances are mapped (for this reason, the term "resistance" used in the preceding and following discussions includes the segment resistances as well as the node resistances).

With regard to the present invention, one skilled in the art in the field of traffic telematics is aware in particular that the remaining blockages, whose associated traffic messages have not yet been deleted according to the present invention, represent the blockages that are (still) being currently bypassed or that currently (still) are to be bypassed. Consideration may be made for the justifiable need to flag, on the display of the navigation system such as on a map, the blockages that are (still) being currently avoided.

Accordingly, the method according to the present invention offers the possibility of identifying or flagging the traffic messages which have not yet been deleted and which were originally a component of the selected route, but which are bypassed by the alternatively selected route and have not yet been completely bypassed. The identification or flagging may be achieved in the form of at least one list and/or in the form of at least one map, such as a route network, in particular a road network, for example by representing the relevant traffic messages by appropriate identification or flagging in a map illustration on at least one readout device or at least one display.

The method according to the present invention also prevents the traffic messages associated with the blockages from being deleted too soon, and prevents the route from thus leading to the previously defined blockage again. Assurance is also provided that the blockage is deleted in the memory unit of the navigation system at a time when no further influence from the current route is possible; thus, it is no longer necessary to check the influence on the current route by recalculating the route, which would typically be required if the traffic message associated with the blockage were manually deleted.

The present invention further relates to the use of the method described above in a means of transportation, in particular in a navigation system of a means of transportation.

Alternatively or additionally, the method described above may be used in a, in particular software-based, route search application of an electronic data processing system, in particular a personal computer (PC), as a PC tool; before beginning the trip the user of the electronic data processing system is thus able to check the announced route for at least one traffic-related event, such as at least one blockage, at least one event of congested or stop-and-go traffic, and/or at least one traffic accident; if needed, the user of the electronic data processing system may then have an alternative or backup route determined and displayed.

The method described above may also be used for a service provider to calculate a more conveniently optimized route upon request by a user, taking into account traffic messages which are associated with at least one directed segment and/or at least one node, using an electronic data processing system, the route thus determined being transmitted to the means of transportation, in particular to the motor vehicle, of the user by remote data transmission.

The present invention relates lastly to a navigation system for a means of transportation, in particular for a motor vehicle, having at least one memory unit for mapping a route network, in particular a road network, as directed segments and nodes situated between the directed segments; and at least one computing unit for carrying out the method described above.

According to one inventive refinement of the present navigation system, this navigation system may have at least one readout device or at least one display for displaying the traffic-related event and/or the traffic message associated with the traffic-related event.

DETAILED DESCRIPTION

Figure 1:
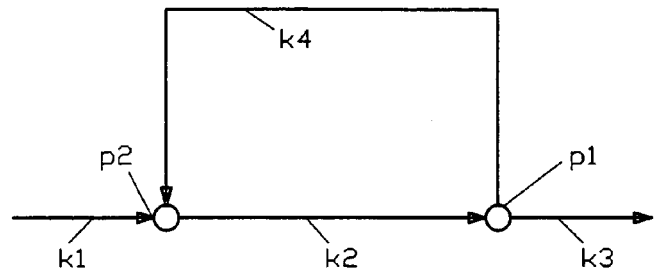
FIGS. 1 through 7 show particular illustrations of a route network, in particular an actual road network, as a network of directed segments and nodes situated between the directed segments.

The following explanations of the present method, by which a traffic message which is associated with at least one directed segment k and/or at least one node p is automatically deleted, are supported by FIGS. 1 through 7 by way of illustration, the above-described situation of a mapping of a route network, in particular an actual road network, being understood as a network of directed segments k and nodes p situated between directed segments k which function as mesh points in a memory unit, and the above-mentioned terminology being used; in particular, the route is specified as a series of segments k in such a way that the sum of all path resistances is a minimum (see the exemplary network according to FIG. 1, having segments k1, k2, k3, and k4 as well as nodes p1 and p2, node p1 functioning as a mesh point for segments k2, k3, and k4, and node p2 functioning as a mesh point for segments k1, k2, and k4).

Figure 2:
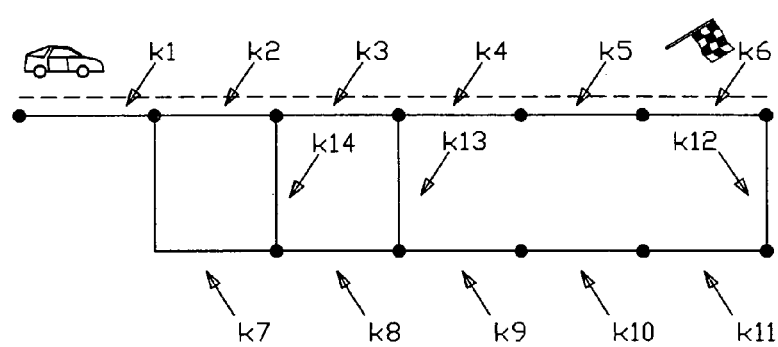

In the exemplary embodiment, a means of transportation in the form of a motor vehicle travels, according to FIG. 2, from a starting point symbolized by segment k1 to a destination symbolized by segment k6. On the originally planned route k1 (=origin)→k2→k3→k4→k5→k6 (=destination), the particular resistance remaining, defined by the distance remaining to the destination, is obtained according to Table 1:

| Segment | Distance remaining to destination | Resistance remaining to destination |
| --- | --- | --- |
| k1 (=origin) | 500 meters | 500 |
| k2 | 400 meters | 400 |
| k3 | 300 meters | 300 |
| k4 | 200 meters | 200 |
| k5 | 100 meters | 100 |
| k6 (=destination) | 0 meters | 0 |

As can be seen from Table 1, a specific path resistance (=100) is assigned to each segment k (100 meters in length, as an example), all segment resistances being the same in the embodiment.

If a blockage, resulting from a traffic accident, for example, is now defined on segments k2 and k3 of the route and associated with a traffic message, before the path resistance of segments k2 and k3 is correspondingly increased for blockage of these segments the resistance remaining to the destination—in the embodiment, the resistance remaining at reference segment k4 (=200)—subsequent to the blockage in the direction toward the destination is temporarily stored as the reference resistance for the subsequent check of the deletion condition.

Figure 3:
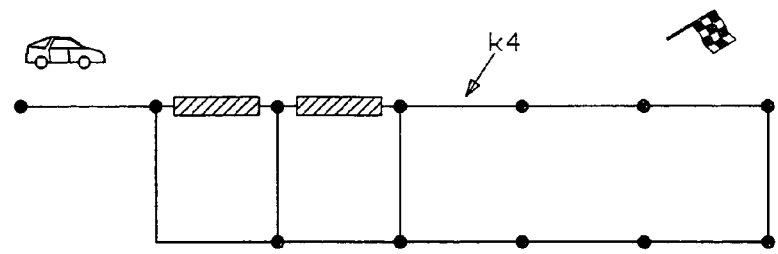
Figure 4:
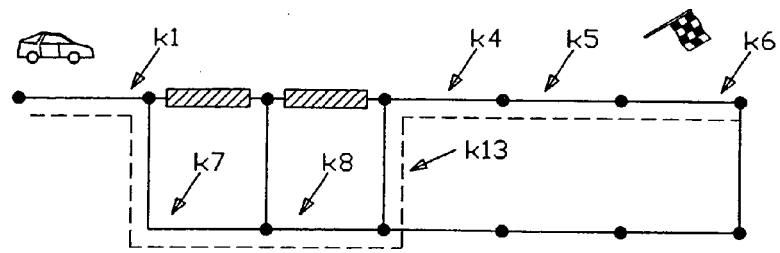

The blockage of segments k2 and k3 is now activated according to FIG. 3, and the route, i.e., in particular the sum of the resistances remaining between the current position and the destination, is recalculated in a computing unit in the navigation system, resulting in an alternative route k1 (=origin)→k7 →k8→k13→k4→k5→k6 (=destination) instead of the originally planned route k1 (=origin)→k2→k3→k4→k5→k6 (=destination) according to FIG. 4, the particular resistance remaining to the destination, defined by the distance remaining to the destination, for the alternative route being obtained from Table 2:

| Segment | Distance remaining to destination | Resistance remaining to destination |
| --- | --- | --- |
| k1 (=origin) | 700 meters | 700 |
| k7 | 600 meters | 600 |
| k8 | 400 meters | 400 |
| k13 | 300 meters | 300 |
| k4 | 200 meters | 200 |
| k5 | 100 meters | 100 |
| k6 (=destination) | 0 meters | 0 |

Figure 5:
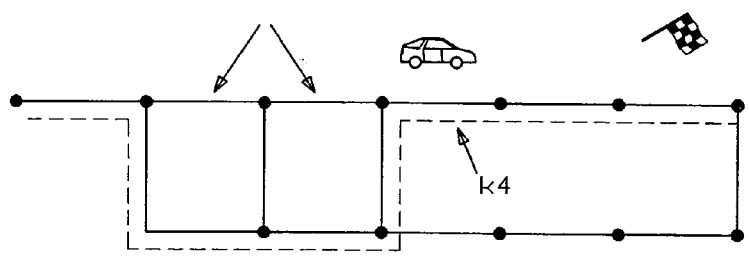

If, in accordance with the criterion of comparing resistances according to the teaching of the present invention, the sum of the resistances remaining between the instantaneous position and the destination when the alternative route is traveled, i.e., the resistance remaining to the destination—for example, for the continuous comparison using the computing unit in the navigation system—for the first time is now less than or equal to the resistance remaining at reference segment k4 (=200) previously stored in temporary memory, the traffic message corresponding to the blockage of segments k2 and k3 may be automatically deleted by the navigation system, in particular from the memory of the navigation system, since, beginning at this time when the above-mentioned sum of resistances falls below the resistance remaining at reference segment k4, it can be ruled out that the alternative route still leads through the segment to be blocked (see FIG. 5).

Figure 6:
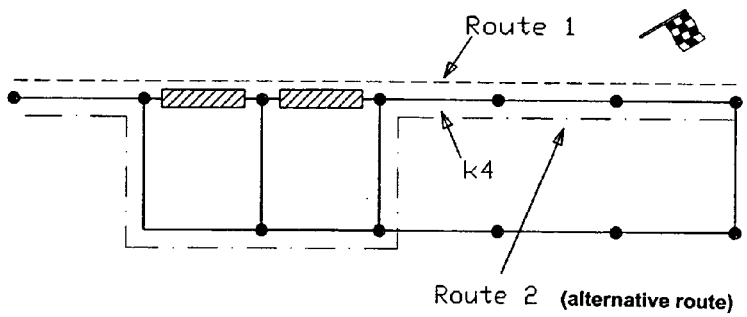

With regard to the method according to the present invention, the question could arise as to whether it is possible, by comparing the route segments before the alternative route (=route 1 according to FIG. 6) is calculated to the route segments after the alternative route (=route 2 according to FIG. 6) is calculated, to determine the common route after bypassing the blockage and to delete the traffic message associated with the blockage as soon as the common segment subsequent to the blockage is traveled; this procedure, which is seemingly obvious at the outset, would likewise delete the traffic message associated with the blockage when reference segment k4 is traveled, in the embodiment according to FIG. 6.

Figure 7:
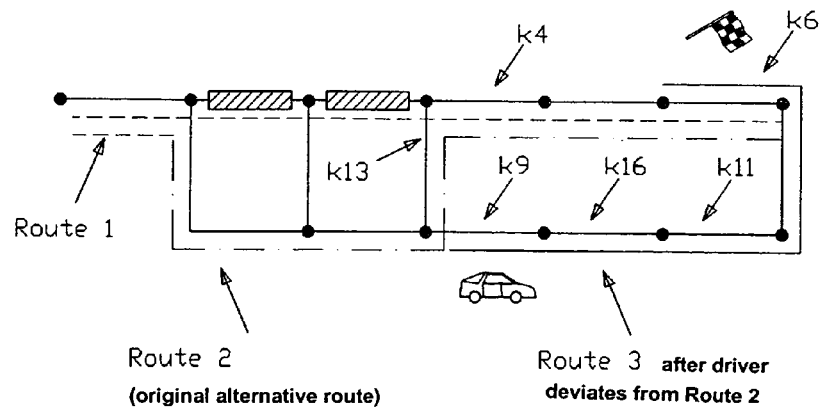

There is a disadvantage in this procedure, however, in that the driver of the motor vehicle assumedly deviates for example from route 2, i.e., from the alternative route, and/or that additional traffic messages arrive and the route assumes a new course (=route 3 according to FIG. 7) which has no common features with route 1 before the alternative route is calculated, i.e., before the traffic message provides notification of the blockage of segments k2 and k3, as shown in FIG. 7.

It is notable that in FIG. 7 the traffic message corresponding to the blockage is not deleted as soon as possible, since route 1 according to FIG. 7 and route 3 according to FIG. 7 no longer have a common reference segment k4. However, if use is now made of the criterion of comparing resistances according to the present invention, the traffic message associated with the blockage is deleted when segment k11 is traveled (see FIG. 7), since at this location on route 3 the resistance remaining to the destination is for the first time equal to or less than the resistance remaining at reference segment k4 (=200) which was previously stored in temporary memory, as shown in Table 3:

| Segment | Distance remaining to destination | Resistance remaining to destination |
| --- | --- | --- |
| k9 | 400 meters | 400 |
| k10 | 300 meters | 300 |
| k11 | 200 meters | 200 |
| k6 (=destination) | 0 meters | 0 |

Lastly, with regard to the present method it should be noted that the present invention is verifiable when entered blockages may be retrieved again by the driver. This can be accomplished, for example, by a listing of activated blockages, by an option to once again delete the blockages, or by representation on a map on the display of the navigation system.

At least one of these functions is typically provided by all navigation systems in order to present the route selection by the navigation system to enable at least a rough plausibility check to be performed, or to design the inputs to be correctable. If the ability to repeatedly retrieve is provided, an available method for automatically deleting blockages may be verified by road tests.

What is claimed is:

1. A method of automatically deleting a traffic message that is associated with at at least one of least one directed segment and at least one node, comprising:

mapping a route network in a memory unit as the at least one directed segment and the at least one node situated between two of the at least one directed segment;

associating a specific resistance with at least one of the at least one segment and the at least one node in such a way that one of the following:

at least one of a resistance of one of the at least one segment affected by the traffic message and a resistance of one of the at least one node affected by the traffic message is increased, and at least one of the segment affected by the traffic message and the node affected by the traffic message is blocked according to an infinite resistance; and specifying a route being as a series of segments such that a sum of all resistances is minimum, wherein:

the traffic message is deleted when the sum of the resistances remaining between a current position and a destination is no more than a reference resistance that is determined by the sum of the resistances remaining between a reference segment and the destination, and the reference segment corresponds to the segment subsequent to the segment of the route, in a direction toward the destination, that is affected by the traffic message and that was the route specified before the traffic message was taken into account.

2. The method as recited in claim 1, wherein:
the route network includes a road network.

3. The method as recited in claim 1, further comprising:
temporarily storing the reference resistance in the memory unit;
recalculating the sum of the resistances remaining between the current position and the destination;
comparing the sum of the resistances, remaining between the current position and the destination to the reference resistance; and deleting the traffic message from the memory unit when the sum of the resistances remaining between the current position and the destination falls below the reference resistance.

4. The method as recited in claim 1, wherein:
the traffic message is associated with at least one traffic-related event corresponding to at least one of at least one blockage, at least one event of one of congested and stop-and-go traffic, and at least one traffic accident, and
the traffic message is triggered by the at least one traffic-related event.

5. The method as recited in claim 4, wherein:
the at least one traffic-related event, whose associated traffic message has not yet been deleted and in particular is being bypassed, or in particular has yet to be bypassed, is one of identified and flagged.

6. The method as recited in claim 5, wherein:
the traffic-related event is one of identified and flagged at least one of:
in the form of at least one list, and
in the form of at least one map, such as a route network.

7. The method as recited in claim 6, wherein:
the at least one map includes the route network.

8. The method as recited in claim 7, wherein:
the route network includes a road network.

9. The method as recited in claim 6, further comprising:
displaying at least one of the traffic-related event and the traffic message associated with the traffic-related event on one of at least one readout device and at least one display.

10. The method as recited in claim 1, further comprising:
downloading the traffic message directly to a navigation system using one of traffic telematics and an on-line service provider.

11. The method as recited in claim 10, wherein:
the traffic telematics includes one of GPRS (General Packet Radio Service), GSM (Global System for Mobile Communication), and UMTS (Universal Mobile Telecommunication System).

12. A navigation system for a motor vehicle, comprising:
at least one memory unit for mapping a route network as directed segments (k) and nodes situated between the directed segments; and
at least one computing unit for performing the following:
mapping the route network in the memory unit as the at least one directed segment and the at least one node situated between two of the at least one directed segment,
associating a specific resistance with at least one of the at least one segment and the at least one node in such a way that one of the following:
at least one of a resistance of one of the at least one segment affected by the traffic message and a resistance of one of the at least one node affected by the traffic message is increased, and
at least one of the segment affected by the traffic message and the node affected by the traffic message is blocked according to an infinite resistance, and specifying a route being as a series of segments such that a sum of all resistances is minimum, wherein:

the traffic message is deleted when the sum of the resistances remaining between a current position and a destination is no more than a reference resistance that is determined by the sum of the resistances remaining between a reference segment and the destination, and the reference segment corresponds to the segment subsequent to the segment of the route, in a direction toward the destination, that is affected by the traffic message and that was the route specified before the traffic message was taken into account.

13. The navigation system as recited in claim 12, wherein:

the route network includes a road network.

14. The navigation system as recited in claim 12, further comprising:

one of at least one readout device and at least one display for displaying at least one of a traffic-related event and the traffic message associated with the traffic-related event.

* * * * *

UNITED STATES PATENT AND TRADEMARK OFFICE
CERTIFICATE OF CORRECTION

PATENT NO. : 6,999,872 B2
APPLICATION NO. : 10/450923
DATED : February 14, 2006
INVENTOR(S) : Fabian et al.

It is certified that error appears in the above-identified patent and that said Letters Patent is hereby corrected as shown below:

Column 2, line 36, change "in comes into consideration" to --comes into consideration--

Column 7, line 28, change "with at at least one of least one" to --with at least one of at least one--

Signed and Sealed this

Second Day of January, 2007

JON W. DUDAS
*Director of the United States Patent and Trademark Office*